United States Patent
Willmot et al.

(10) Patent No.: US 12,365,477 B1
(45) Date of Patent: Jul. 22, 2025

(54) HYDROGEN FUELLED AIRCRAFT PROPULSION SYSTEM

(71) Applicant: ROLLS-ROYCE plc, London (GB)

(72) Inventors: Michael C. Willmot, Derby (GB); William J. Hunt, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 19/089,168

(22) Filed: Mar. 25, 2025

(30) Foreign Application Priority Data

Apr. 23, 2024 (GB) .................................... 2405690

(51) Int. Cl.
| | | |
|---|---|---|
| *B64D 37/30* | (2006.01) | |
| *B64D 37/04* | (2006.01) | |
| *B64D 37/34* | (2006.01) | |
| *F02C 3/22* | (2006.01) | |
| *F02C 7/224* | (2006.01) | |
| *F02C 7/236* | (2006.01) | |
| *F02C 9/40* | (2006.01) | |

(52) U.S. Cl.
CPC ............ *B64D 37/30* (2013.01); *B64D 37/04* (2013.01); *B64D 37/34* (2013.01); *F02C 3/22* (2013.01); *F02C 7/224* (2013.01); *F02C 7/236* (2013.01); *F02C 9/40* (2013.01); *F05D 2220/323* (2013.01)

(58) Field of Classification Search
CPC ........ B64D 37/04; B64D 37/30; B64D 37/34; F02C 3/22; F02C 3/224; F02C 3/236; F02C 9/40

See application file for complete search history.

(56) References Cited

U.S. PATENT DOCUMENTS

2021/0381429 A1 12/2021 Taylor
2023/0339621 A1* 10/2023 Sarkar ...................... F02C 3/22

FOREIGN PATENT DOCUMENTS

WO 2024142985 A1 7/2024

OTHER PUBLICATIONS

Great Britain search report dated Sep. 24, 2024, issued in GB Patent Application No. 2405690.5.

* cited by examiner

*Primary Examiner* — Kyle Robert Thomas

(57) ABSTRACT

A fuel system for a hydrogen fueled aircraft propulsion system comprises first and second hydrogen fuel tanks configured to store liquid hydrogen, first fuel line and second fuel lines configured to supply hydrogen from the first hydrogen fuel tank to a combustor of a first gas turbine engine and from the second hydrogen fuel tank to a combustor of a second gas turbine engine respectively. First and second fuel pumps are provided, each being configured to pump fuel in a respective first and second fuel line. First and second fuel heaters are provided, each being configured to heat fuel in a respective first and second fuel line. A fuel cross-feed fuel line is provided, which is configured to transfer fuel between the first and second fuel lines. The fuel cross-feed line is provided downstream in fuel flow of the first and second fuel heaters.

15 Claims, 4 Drawing Sheets

HYDROGEN FUELLED AIRCRAFT PROPULSION SYSTEM

CROSS-REFERENCE TO RELATED APPLICATIONS

This specification is based upon and claims the benefit of priority from United Kingdom patent application number GB 2405690.5 filed on Apr. 23, 2024, the entire contents of which is incorporated herein by reference.

BACKGROUND

Technical Field

This disclosure relates to fuel systems for hydrogen fueled aircraft propulsion systems, methods of operating such systems, propulsion systems incorporating such fuel systems, and aircraft comprising such propulsion systems.

Description of the Related Art

In order to limit emissions of carbon dioxide, use of hydrogen stored as a liquid as an alternative to conventional hydrocarbon fuel in aircraft gas turbine engines has been proposed. However, managing such fuels in an aircraft in view of their low temperatures and high volumes presents challenges. Additionally, such systems must be tolerant of failures.

SUMMARY

In a first aspect there is provided a fuel system for a hydrogen fueled aircraft propulsion system, the fuel system comprising:
- a first hydrogen fuel tank configured to store liquid hydrogen;
- a first fuel line configured to supply hydrogen from the first hydrogen fuel tank to a combustor of a first gas turbine engine;
- a second hydrogen fuel tank configured to store liquid hydrogen;
- a second fuel line configured to supply hydrogen from the second hydrogen fuel tank to a combustor of a second gas turbine engine;
- a first fuel pump configured to pump fuel in the first fuel line;
- a second fuel pump configured to pump fuel in the second fuel line;
- a first fuel heater configured to heat fuel in the first fuel line;
- a second fuel heater configured to heat fuel in the second fuel line; and
- a fuel cross-feed fuel line configured to transfer fuel between the first and second fuel lines; wherein
- the fuel cross-feed line is provided downstream in fuel flow of the first and second fuel heaters.

It has been found that it may be desirable to provide cross-fuel flow between hydrogen fuel lines, such that hydrogen fuel can continue to be provided to the engine combustor of both engines in the event of a partial fuel system failure. By providing the cross-feed fuel line downstream of the fuel heater, gaseous rather than liquid hydrogen is provided in the cross-fuel line, thereby avoiding the possibility of fluid locking or sudden boiling and overpressure. Accordingly, a safe, failure tolerant fuel system is provided. Further features and advantages of the disclosure are set out below.

Each fuel heater may be configured to vaporise liquid hydrogen fuel.

Each of the first and second pumps may be provided upstream in hydrogen flow of the fuel cross-feed line. Accordingly, the fuel pumps can be employed to both provide fuel to the respective engines during normal operation, and cross-feed flow in the event of a partial system failure.

Each of the first and second fuel heaters may be provided downstream in hydrogen flow of a respective fuel pump.

Each fuel heater may comprise a recuperator heat exchanger configured to exchange heat between gas turbine engine core exhaust gases and hydrogen fuel.

Each recuperator is reconfigurable to heat fuel in the first hydrogen fuel line and to heat fuel in the second hydrogen fuel line. Accordingly, fuel heating for both engines can be provided using exhaust heat from either engine, thereby simplifying engine start-up and in-flight restart.

Alternatively or in addition, each fuel heater may comprise an auxiliary combustor configured to burn hydrogen fuel diverted from one or more hydrogen fuel lines. The auxiliary heater may be provided with compressed air from a compressor one or more of the gas turbine engines.

The fuel system may comprise first and second further heat exchangers in respective first and second hydrogen fuel lines provided downstream in hydrogen fuel flow of the fuel cross-feed line.

Advantageously, hydrogen can be heated to a minimum temperature to gasify the hydrogen fuel in the heat exchanger upstream of the fuel cross-feed line and heated further downstream, thereby maintaining a minimum volume of fuel that must be handled by the fuel cross-feed line.

The fuel system may comprise respective first and second gaseous hydrogen fuel buffer tanks downstream in hydrogen fuel flow of the fuel cross-feed line. Advantageously, fuel flow interruptions caused by failure of an upstream component before operation of the cross-feed line can be accommodated.

The fuel system may comprise a fuel cross-feed valve configured to control hydrogen fuel flow through the fuel cross-feed line.

The fuel system may comprise first and second fuel tank shut-off valves configured to control flow from respective fuel tanks in respective hydrogen fuel lines.

The fuel system may comprise a controller configured to control at least the fuel cross-feed valve. The controller may be configured to control the first and second fuel tank shut-off valves.

The controller may be configured to operate a respective fuel shut-off valve to halt flow through a failed fuel line in the event of a failure of a respective fuel tank, fuel pump or fuel heater, and open the fuel cross-feed valve to permit flow from the remaining hydrogen fuel line to the failed fuel line.

According to a second aspect there is provided an aircraft propulsion system comprising first and second gas turbine engines and a fuel system in accordance with the first aspect.

According to a third aspect there is provided an aircraft comprising the propulsion system of the second aspect.

According to a fourth aspect there is provide a method of operating a hydrogen fueled aircraft propulsion system according to the second aspect, the method comprising:
- operating a respective fuel shut-off valve to halt flow through a failed fuel line in the event of a failure of a respective fuel tank, fuel pump or fuel heater, and opening the fuel cross-feed valve to permit flow from the remaining hydrogen fuel line to the failed fuel line.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
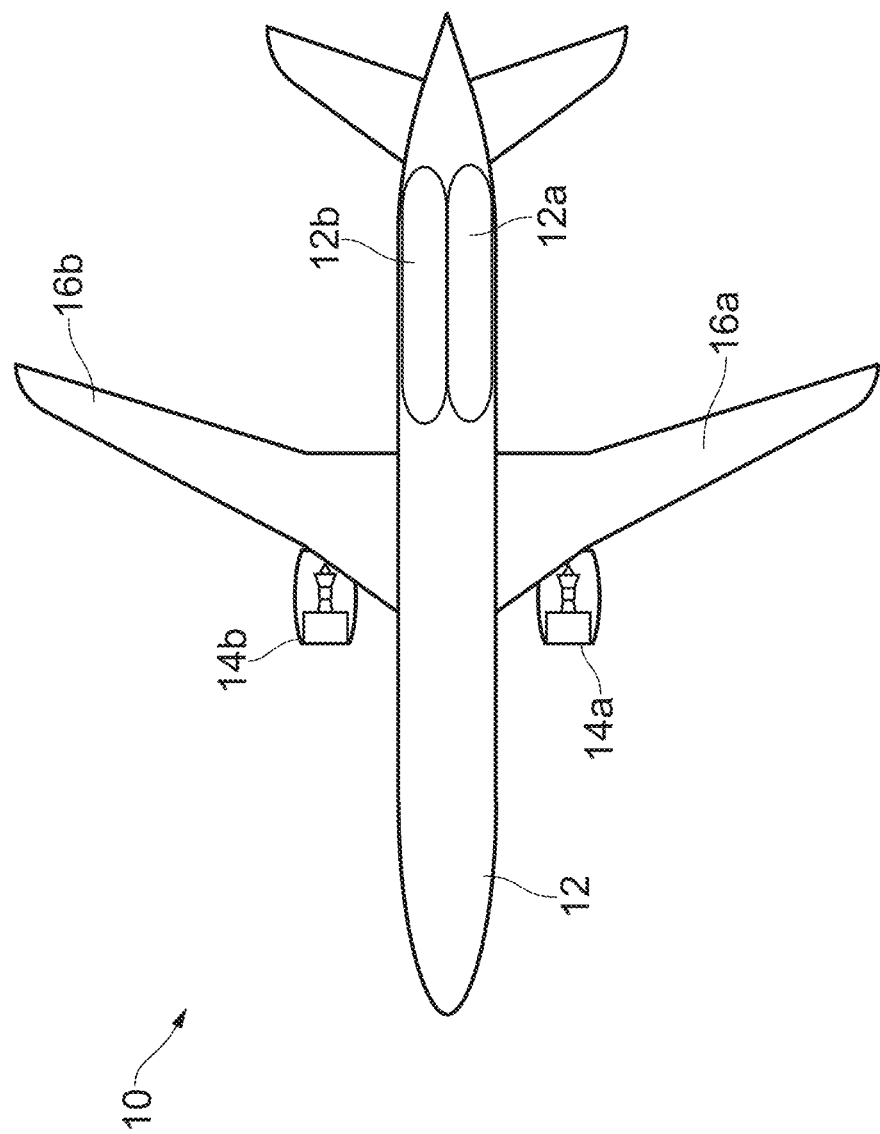
FIG. 1 shows a first cryogenic-fueled airliner comprising a propulsion system comprising cryogenic-fueled turbofan engines.

A hydrogen-fueled airliner is illustrated in FIG. 1. In this example, the airliner 10 is of substantially conventional tube-and-wing twinjet configuration with a central fuselage 12 and substantially identical first and second turbofan engines 14a, 14b mounted underneath respective wings 16a, 16b.

First and second cryogenic liquid hydrogen fuel storage tanks 12a, 12b are located in the fuselage 102, and are installed in a side-by-side configuration.

Figure 2:
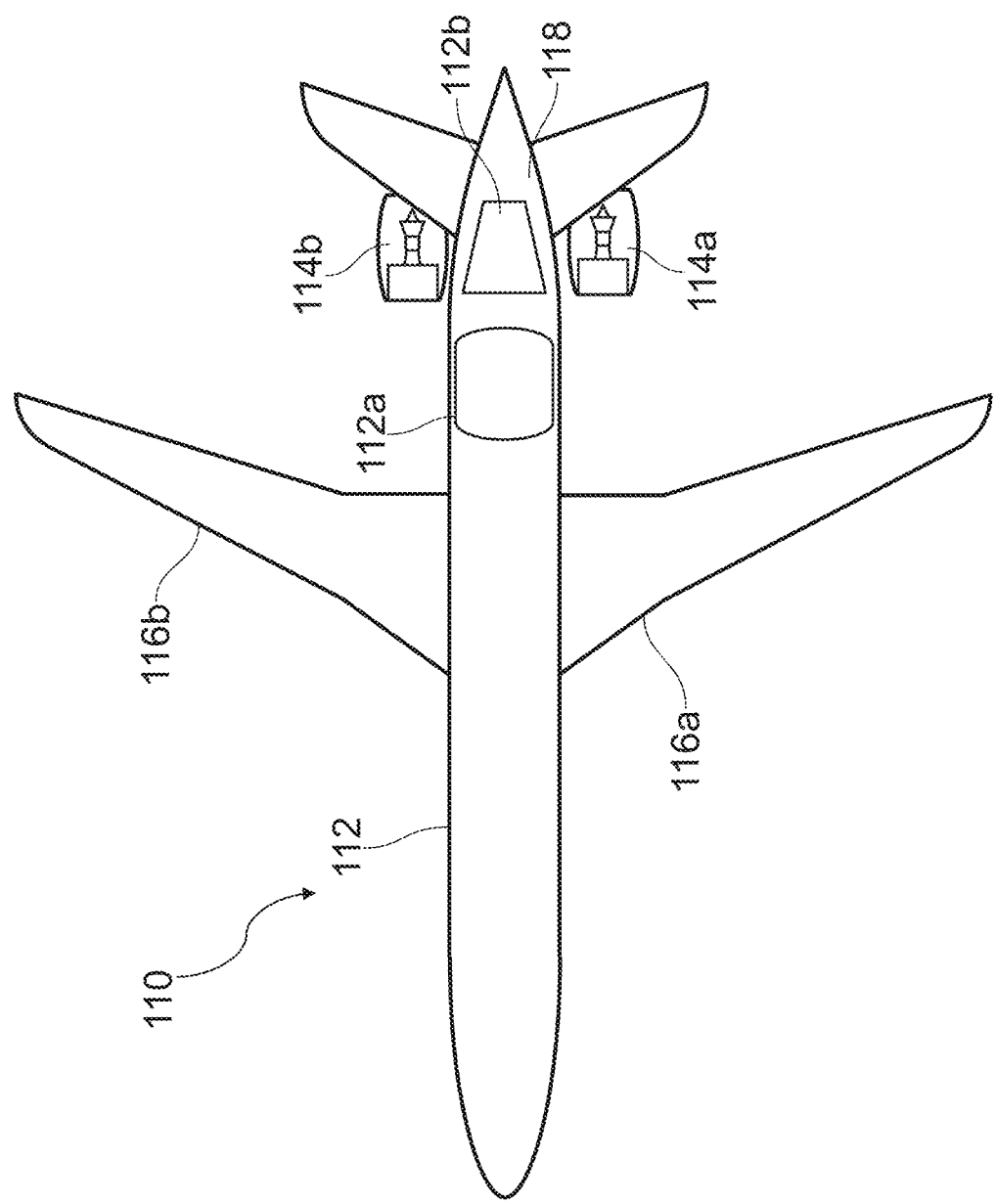
FIG. 2 shows a second cryogenic-fueled airliner comprising a propulsion system comprising cryogenic-fueled turbofan engines.

FIG. 2 shows an alternative hydrogen-fueled airliner configuration. In this embodiment, the airliner 110 again comprises a fuselage 112 and wings 116a, 116b, but the engines 114a, 114b and fuel tanks 112a, 112b are installed in a different configuration compared to the first embodiment.

In this embodiment, the engines 114a, 114b are installed in an aft fuselage mounted position adjacent an empennage 118, with a first engine 114a installed on a port fuselage side, and a second engine 114b installed on a starboard fuselage side.

The fuel tanks 112a, 112b are installed in a fore-aft configuration adjacent the engines 114a, 114b, with fuel tank 112a being provided forward of fuel tank 112b, though it will be appreciated that the tanks could be installed the other way around or in a side-by-side configuration similar to the aircraft of FIG. 1. This configuration, in which both the fuel tanks 112a, 112b and engines 114a, 114b are installed in the rear fuselage, has the advantage of reducing the distance between the tanks 112a, 112b and engines 114a, 114b, and avoiding the requirement to transmit fuel adjacent the passenger compartment. On the other hand, the embodiment of FIG. 1 may be more structurally efficient.

Figure 3:
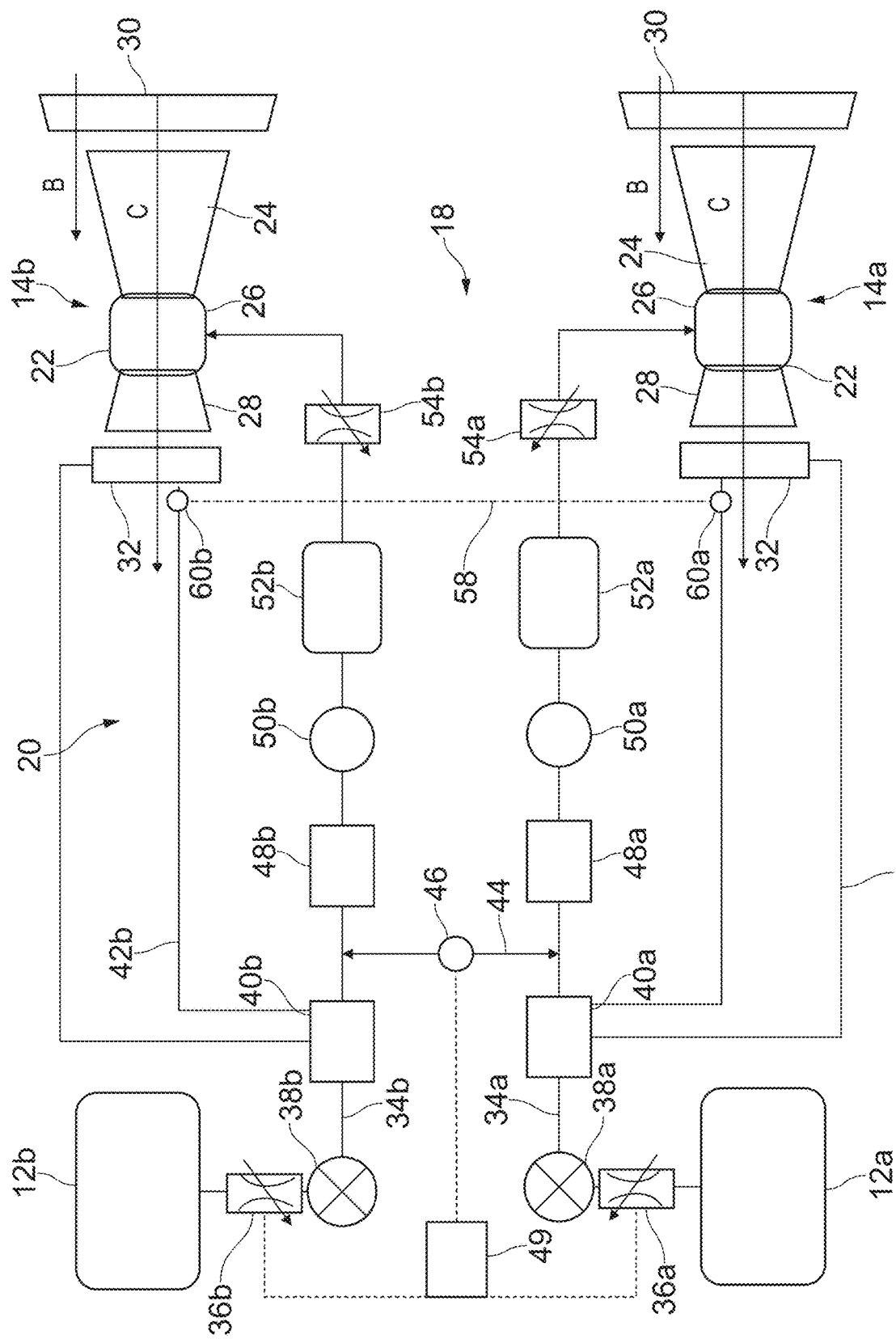
FIG. 3 is a functional block diagram showing the fuel system for the propulsion system of FIG. 1 or FIG. 2.

The engines 14a, 14b, 114a, 114b fuel tanks 12a, 12b, 112a, 112b and a fuel system 18 form a propulsion system 20. A functional block diagram of the propulsion system 20 is shown in FIG. 3. As will be understood, the propulsion system 20 is suitable for use with the aircraft of FIG. 1 or FIG. 2, and may be suitable for use with still further aircraft configurations, since as blended wing body types.

The engines 14a, 14b are in the form of gas turbine engines each comprising a core gas turbine 22.

The core gas turbine 22 comprises, in fluid flow series, a compressor 24, a combustor 26 and a turbine 28. The turbine 28 and compressor 24 are interconnected by a shaft (not shown). It will be appreciated that in alternative embodiments, the core gas turbine could be of two-shaft or three-shaft configuration, and/or could comprise a reduction gearbox. For example, the gas turbine engine could comprises separate low and high-pressure compressors and turbines interconnected by respective low and high-pressure shafts. The turbine 28 (or in some embodiments, a separate fan-drive turbine) drives a fan 30. Inlet air A is ingested by the fan 30, which provides a core airflow C to the gas turbine engine core 22, and a bypass airflow B, which bypasses the core 22, and provides thrust via a bypass nozzle (not shown).

In the present embodiment, the gas turbine engines 14a, 14b each also comprise a heat exchanger in the form of a respective recuperator 32. Each recuperator 32 is provided in core airflow downstream of at least one turbine stage, and in some embodiments, downstream of a final turbine stage 28. The role of the recuperator 32 is described in detail later.

As shown in FIG. 3, each hydrogen fuel tank 12a, 12b is associated with a combustor 26 of a respective gas turbine engine 14a, 14b via a respective main hydrogen fuel line 34a, 34b.

Respective fuel pumping, heating and control equipment is associated with each fuel line 34a, 34b.

Immediately downstream of each tank 12a, 12b is a respective fuel shut-off valve 36a, 36b, which controls flow from the respective tank 12a, 12b to the respective fuel line 34a, 34b. A respective pump 38a, 38b is then provided in each fuel line 34a, 34 downstream of the respective shut-off valve 36a, 36b, to pressurise and drive flow through the respective fuel line 34a, 34b.

Each pump 38a, 38b is configured to primarily operate on liquid hydrogen, though it will be appreciated that some multi-phase flow may be present in each pump 38a, 38b. Suitable pumps include, for example, centrifugal pumps, and may be driven by electric motors or a direct mechanical drive from the engine 14a, 14b.

A respective fuel heater 40a, 40b is provided downstream of the respective pump 38a, 38b in each fuel line 34a, 34b. Each fuel heater 40a, 40b is configured to warm the hydrogen fuel in a respective fuel line 34a, 34b, to thereby vaporise it from a liquid phase to a gaseous or supercritical phase. Typically, the pre-heaters 40a, 40b are configured to warm the fuel from a temperature below its critical temperature of approximately 33 Kelvin, to a temperature suitable for combustion, for example above 100 Kelvin.

Each fuel heater 40a, 40b comprises a heat exchanger. Each fuel heater heat exchanger 40a, 40b is configured to exchange heat between cold hydrogen and a warmer heat exchange fluid, such as glycol provided in a respective intermediate heat exchange fluid line 42a, 42b. Each heat exchange fluid line 42a, 42b comprises a closed loop, which flows between the respective heater 40a, 40b and recuperator 32a, 32b in a respective gas turbine engine 14a, 14b. Accordingly, heat is provided from each gas turbine engine exhaust flow to the hydrogen fuel in each fuel line 34a, 34b via the respective recuperator 32a, 32b, intermediate heat exchange fluid line 42a, 42b and fuel heater 40a, 40b in series. In alternative embodiments, the recuperator 32 could exchange heat with the hydrogen fuel in each fuel line 34a, 34b directly via the preheaters 40a, 40b, without the use of an intermediate heat exchange fluid.

Downstream in hydrogen fuel flow of each heater 40a, 40b is a fuel cross-feed line 44. The fuel cross-feed line 44 extends between the fuel lines 34a, 34b, and is configured to transfer fuel from the first fuel tank 12a to the second main fuel line 34b, and from the second fuel tank 12b to the first main fuel line 34a. As such, either engine 14a, 14b can be supplied with fuel from either fuel tanks 12a, 12b and fuel pump 38a, 38b.

As will be appreciated, the fuel downstream of the fuel heater 40a, 40b is in a gaseous or supercritical phase in normal operation. As such, the cross-feed line 44 does not have to handle liquid hydrogen. This has several operational advantages, which will be explained in detail below.

The cross-feed line 44 also comprises a cross-feed valve 46, which is configured to control flow through the cross-feed line 44. The valve 46 may comprise a two-position valve being configured to permit or prevent flow, and is typically provided in a closed position during normal operation.

Returning to the main hydrogen fuel flow, one or more optional further heat exchangers 48a, 48b are provided. In this example, the heat exchangers comprise oil coolers configured to exchange heat between engine oil from a respective engine 14a, 14b and hydrogen fuel, to thereby heat hydrogen fuel further and cool engine oil. The further heat exchangers 48a, 48b are preferably provided downstream in main hydrogen fuel line 34a, 34b fuel flow, such that the hydrogen fuel flow through the cross-feed line 44 is at a relatively low temperature. Accordingly, the volume of hydrogen fuel in the cross-feed line 44 is reduced for a given mass flow, relative to where the cross-flow line is provided with fuel at the temperature required for combustion.

One or more filters 50a, 50b are also provided. These may be necessary to filter contaminants such as ice or other solid particles or liquid from the fuel stream. Again, the fuel filters 50a, 50b are preferably provided downstream in main hydrogen fuel flow of the cross-feed line 44, such that each fuel filter can be sized for a single engine, rather than having to handle flow for both engines, as will be explained in further detail later.

A gaseous hydrogen fuel buffer tank 52a, 52b is also provided in each fuel line 34a, 34b, and is typically installed downstream of the filter 50a, 50b. The buffer tanks 50a, 50b are configured to store high-pressure gaseous hydrogen for delivery to the combustor 26. The buffer tanks 52a, 52b allow for relatively constant flow pressure and mass flow rates to the combustor 26 during operation, in spite of varying pressure and massflow rates from the pump 38a, 38b, and varying demand from the combustor 26. Again, by providing the buffer tanks 52a, 52b downstream of the cross-feed line 44, each buffer tank 52a, 52b can be sized for a single engine 14a, 14b, rather than being sized to provide the required flow rate of both engines.

Finally, each fuel line 34a, 34b comprises a Fuel Management Unit (FMU) in the form of a throttle valve 54a, 54b configured to control the massflow and pressure of gaseous hydrogen fuel delivered to the engine 14a, 14b. Again provision of the FMUs downstream of the cross-feed line reduces the capacity requirements of these components.

In operation, the system is operated as follows.

During normal operation, each engine 14a, 14b is supplied with fuel independently via its own fuel system and tank 12a, 12b. Initial purging and chill-down steps may be necessary before system start (which are not described in detail here). During normal engine running, the shutoff valves 36a, 36b and are open, and the pumps 38a, 38b are operated to pressurise fuel flow. Heat from the recuperator 32 (or, initially, an auxiliary heater) heats the heaters 40a, 40b, which in turn heats the liquid hydrogen fuel in the fuel lines 34a, 34b. Liquid hydrogen fuel is vapourised in the heaters 40a, 40b. During normal operation, the cross-feed valve 46 is closed, such that gaseous fuel flow continues to the further heat exchangers 48a, 48b, filters 50a, 50b and buffer tanks 52a, 52b. Fuel flow is controlled via the FMU 54a, 54b and is delivered to the combustor 26 of each engine 14a, 14b. As will be appreciated however, the cross-feed line 44 will be filled with gaseous or supercritical hydrogen at the same pressure as the fuel line 34a, 34b, but will not flow between the two systems.

In the event of a failure, the system can continue to operate in view of the cross-flow line 44. The system is controlled by a controller 49, which is in signal communication with the valves 36a, 36b, 46. For example, in the event of a failure (such as a leak) of a tank 12a, 12b, a heater 40a, 40b (such as failure of the heater itself or of the intermediate fluid line 42a, 42b or recuperator 32) or a pump 38a, 38b, the valve 46 can be opened by the controller 49 to allow for flow between the two fuel lines 34a, 34b.

In one example, pump 38a has failed, while pump 38b continues to operate. In view of the failure of pump 38a, the pressure within fuel line 34a begins to fall, as fuel continues to flow to the combustor 26 of engine 14a. However, a required flow rate and pressure can be maintained for a time in view of the remaining fuel in the line 34a, and the buffer tank 52a. To prevent high pressure, high temperature gaseous hydrogen from backflowing past the inoperative pump 38a to the fuel tank 12a, the shut-off valve 36a is operated to close the valve 36a and stop flow.

The cross-flow valve 46 can now be opened. In view of the lower pressure within fuel line 34a relative to line 34b, gaseous fuel can flow from line 34b to line 34a. Since cross-flow line 44 is already primed with gaseous fuel, fuel flow can commence immediately without any risk of hydro-locking and without any requirement for a chill-down procedure. Accordingly, engine operation can continue without any need to shut-down and restart an engine.

Since the pump 38b is now supplying fuel to both engines, the fuel mass flow requirements for the pump 38b are doubled. Accordingly, the pumps 38a, 38b may need to be over-sized to accommodate the increased flow in the event of a failure of one of the pumps. However, the pressure requirement stays the same, and as such, the pump size may not need to be doubled. The fuel heater 40b must also now supply heated fuel for both systems, since the heater 40a is upstream of the cross-feed line, and is now not being supplied with fuel. Accordingly, each heater 40a, 40b must be oversized. On the other hand, the remaining components 48a, 48b, 50a, 50b, 52a, 52b and 54a, 54b continue to operate as normal.

Such an arrangement has further advantages. Firstly, a failure of one of the heaters 40a, 40b can be accommodated in a similar manner to a failure of one of the pumps 38a, 38b. A tank 12a, 12b leak can similarly be overcome by the use of the cross-feed line 44.

In contrast, in a system where a cross-feed is provided upstream of the heaters, the cross-feed line would have to accommodate liquid hydrogen fuel. Stagnant fuel in the cross-feed line would vapourise in view of the low-boiling point of liquid hydrogen when the cross-feed line is not in use, resulting in mixed phase flow, and potential hydro-locking in the system. Alternatively, if the system were kept empty during normal use, the sudden introduction of liquid hydrogen into the warm cross-feed lines would cause the cross-feed lines to rapidly exchange heat with the hydrogen, again boiling it. Such a system would likely require a chill-down procedure prior to operation, leading to delays in the operation of the system in the event of a failure. This could lead to a requirement to shut-down an engine, or would require a much larger buffer tank for each engine to accommodate the chill-down time. As such, the disclosed system has weight and/or safety advantages over alternative systems.

Optionally, the system may comprise further features to improve management of failures. The system optionally comprises an intermediate fluid cross-feed line 58 configured to transfer intermediate heat exchange fluid between lines 42a and 42b in the event of a failure of one of the recuperators or a shutdown of one of the engines 14a, 14b. Fluid transfer through the intermediate fluid cross-flow line can be controlled by valves. In such a case, both heaters 40a, 40b can be operated by valves 60a, 60b at either end. As such, the recuperators 32 are reconfigurable to heat fuel in either the first fuel line 34a or second fuel line 34b.

For example, in the event of a temporary shut-down of engine 14a, fuel flow can be restarted without the use of fuel cross-feed line 44. In such a case, valves 60a, 60b are opened, and intermediate heat transfer fluid is provided from line 42b to line 42a. Fuel flow can then be restarted via pump 38a, and fuel can be heated using heater 40a, using the transferred intermediate heat transfer fluid as a heat source.

The provision of the pre-heaters 40a, 40b upstream of the cross-feed line 44 has further advantages in the event of a temporary shut-down of an engine 14a, 14b, or during a normal start-up.

The fuel within the fuel lines 34a, 34b upstream of the heaters 40a, 40b is below a required combustion temperature. However, heat for the heaters 40a, 40b comes from the recuperators 32, which are in turn heated with exhaust gases from the engines. When the engines are shut-down, exhaust heat is not available, which makes initial start-up and in-flight relight problematic.

The present arrangement resolves this problem by allowing for a shut-down engine to be started using heated fuel from the other fuel system. For example, in the event that engine 14a is shutdown in flight and needs to be restarted, the pumps 38a can be shut, and fuel transferred via the cross-feed line 44. Since the cross-feed line 44 is downstream of the heater 40b, heated fuel is provided, which can allow for restart of the engine. Once the engine is restarted, sufficient exhaust heat will become available to permit fuel to be delivered from tank 12a via pump 38a.

Figure 4:
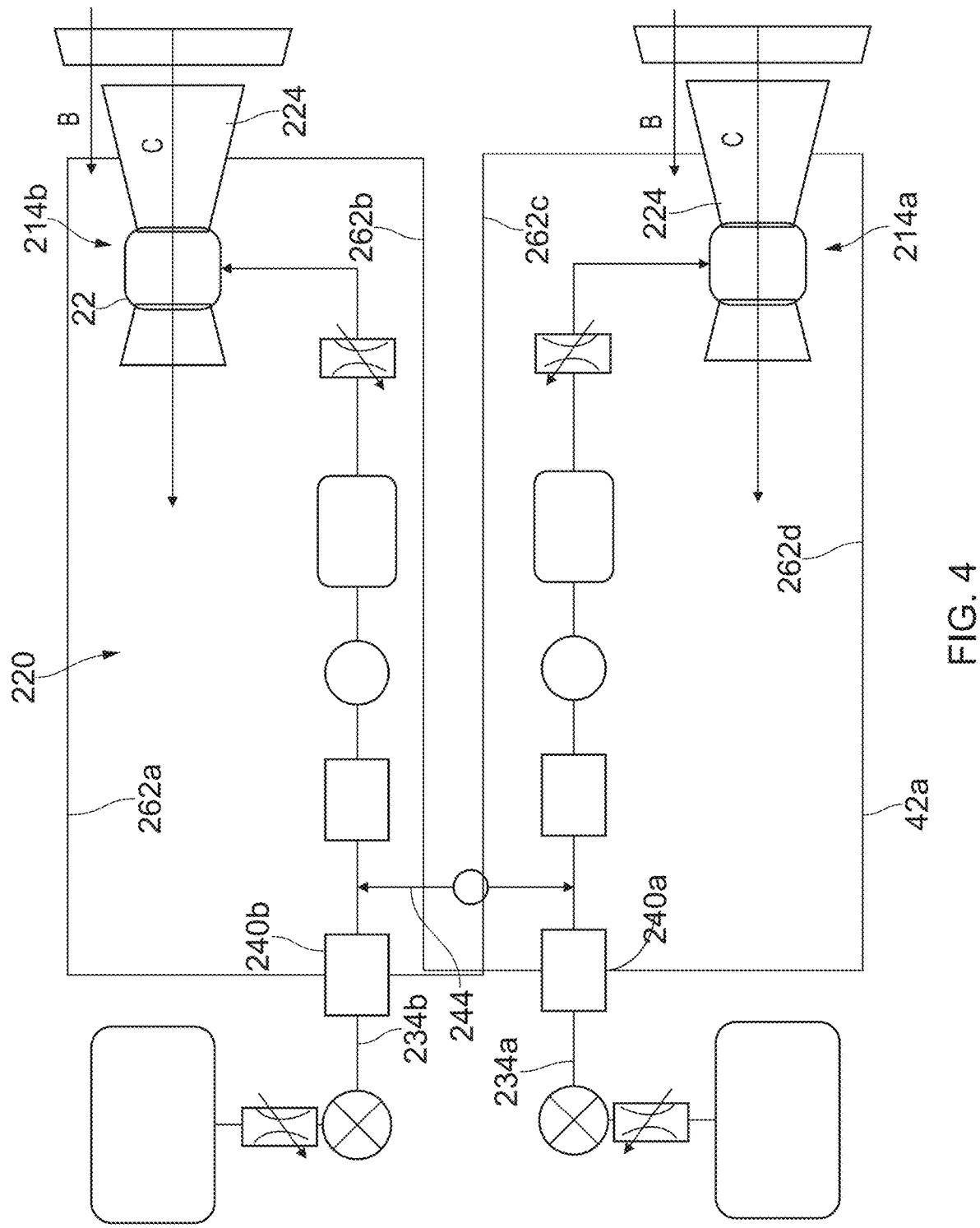
FIG. 4 is a functional block diagram showing an alternative fuel system.

FIG. 4 shows an alternative fuel system 220 having a different fuel heating system. The system is generally similar to the system of FIG. 3, with only differences between the two being described in detail.

In this embodiment, the recuperators are omitted, with preheaters 240a, 240b of a different type being provided.

Each heater 240a, 240b comprises an auxiliary combustor configured to combust a portion of hydrogen fuel tapped off from a respective main hydrogen fuel line 234a, 234b. Each auxiliary combustor 240a, 240b is also provided with high-pressure air for combustion from a bleed line from a compressor 224 of one of the gas turbine engines 214a, 214b.

In the present embodiment, each auxiliary combustor 240a, 240b is supplied with compressed air from both engines. A first bleed line 262a provides compressed air from the compressor 224 of the first gas turbine engine 214a to the first heater 240a. A second bleed line 262b provides compressed air from the compressor 224 of the first gas turbine engine 214a to the second heater 240b. A third bleed line 262c provides compressed air from the compressor 224 of the second gas turbine engine 214b to the first heater 240a. A fourth bleed line 262d provides compressed air from the compressor 224 of the second gas turbine engine 214b to the second heater 240b. Accordingly, in the event of a shut-down of one of the engines 214a, 214b, both heaters 240a, 240b can continue to operate by utilising compressor air from the remaining engine. Accordingly, the shut-down engine can be restarted without a requirement for fuel transfer.

Alternatively, in event of a failure, fuel can be transferred via a cross-feed line 244 similar to the line 44 of FIG. 3.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein. For example, the heaters could use both engine exhaust heat and heat from auxiliary combustors.

Modifications could be made to the disclosed embodiment. For example, the gas turbine engine could be of a different type, and could for instance comprise more or fewer compressor and turbines, and could drive a fan, propeller, electrical generator, or other equipment.

The invention claimed is:

1. A fuel system for a hydrogen fueled aircraft propulsion system, the fuel system comprising:
a first hydrogen fuel tank configured to store liquid hydrogen;
a first fuel line configured to supply hydrogen from the first hydrogen fuel tank to a combustor of a first gas turbine engine;
a second hydrogen fuel tank configured to store liquid hydrogen;
a second fuel line configured to supply hydrogen from the second hydrogen fuel tank to a combustor of a second gas turbine engine;
a first fuel pump configured to pump fuel in the first fuel line;
a second fuel pump configured to pump fuel in the second fuel line;
a first fuel heater configured to heat fuel in the first fuel line;
a second fuel heater configured to heat fuel in the second fuel line; and
a fuel cross-feed fuel line configured to transfer fuel between the first and second fuel lines; wherein
the fuel cross-feed line is provided downstream in fuel flow of the first and second fuel heaters.

2. The fuel system according to claim 1, wherein each fuel heater is configured to vaporise liquid hydrogen fuel.

3. The fuel system according to claim 1, wherein each of the first and second pumps are provided upstream in hydrogen flow of the fuel cross-feed line.

4. The fuel system according to claim 1, wherein each fuel heater comprises a recuperator heat exchanger configured to exchange heat between gas turbine engine core exhaust gases and hydrogen fuel.

5. The fuel system according to claim 4, wherein each recuperator is reconfigurable to heat fuel in the first hydrogen fuel line and to heat fuel in the second hydrogen fuel line.

6. The fuel system according to claim 1, wherein each fuel heater comprises an auxiliary combustor configured to burn hydrogen fuel diverted from one or more hydrogen fuel lines.

7. The fuel system according to claim 6, wherein each auxiliary heater is provided with compressed air from a compressor one or more of the gas turbine engines.

8. The fuel system according to claim 1, wherein the fuel system comprises first and second further heat exchanger in respective first and second hydrogen fuel lines provided downstream in hydrogen fuel flow of the fuel cross-feed line.

9. The fuel system according to claim 1, wherein the fuel system comprises respective first and second gaseous hydrogen fuel buffer tanks downstream in hydrogen fuel flow of the fuel cross-feed line.

10. The fuel system according to claim 1, wherein the fuel system comprises a fuel cross-feed valve configured to control hydrogen fuel flow through the fuel cross-feed line.

11. The fuel system according to claim 1, wherein the fuel system comprises first and second fuel tank shut-off valves configured to control flow from respective fuel tanks in respective hydrogen fuel lines.

12. The fuel system according to claim 10, when dependent on claim 10, wherein the fuel system comprises a controller configured to control at least the fuel cross-feed valve and the controller may be configured to control the first and second fuel tank shut-off valves.

13. The fuel system according to claim 12, wherein the controller is configured to operate a respective fuel shut-off valve to halt flow through a failed fuel line in the event of a failure of a respective fuel tank, fuel pump or fuel heater, and open the fuel cross-feed valve to permit flow from the remaining hydrogen fuel line to the failed fuel line.

14. An aircraft propulsion system comprising first and second gas turbine engines and a fuel system in accordance with claim 1.

15. A method of operating a hydrogen fueled aircraft propulsion system according to claim 14, the method comprising:

operating a respective fuel shut-off valve to halt flow through a failed fuel line in the event of a failure of a respective fuel tank, fuel pump or fuel heater, and opening the fuel cross-feed valve to permit flow from the remaining hydrogen fuel line to the failed fuel line.

\* \* \* \* \*